United States Patent [19]
Kim

[11] Patent Number: 6,092,255
[45] Date of Patent: Jul. 25, 2000

[54] SCRAPER OR SQUEEGEE WITH CURVED BLADE SURFACES

[76] Inventor: Frank Y. H. Kim, 9880 S. Bathhurs Wy., Highlands Ranch, Colo. 80126

[21] Appl. No.: 09/132,266

[22] Filed: Aug. 11, 1998

[51] Int. Cl.[7] .............................. A47L 3/11; A47L 3/12; A47L 1/06
[52] U.S. Cl. ..................... 15/121; 15/105; 15/236.02; 15/236.07; 15/244.1; 15/245
[58] Field of Search ..................... 15/105, 121, 220.1, 15/236.02, 236.07, 244.1, 245

[56] References Cited

U.S. PATENT DOCUMENTS

| | | | |
|---|---|---|---|
| 2,625,700 | 1/1953 | Baldwin | 15/121 |
| 3,526,918 | 9/1970 | Leland | 15/244.1 X |
| 5,349,716 | 9/1994 | Millar | 15/245 |
| 5,680,668 | 10/1997 | Kim | 15/236.02 |

FOREIGN PATENT DOCUMENTS

909288  10/1962  United Kingdom ............. 15/121

*Primary Examiner*—Mark Spisich
*Attorney, Agent, or Firm*—Browdy and Neimark

[57] ABSTRACT

A combination windshield scraper, squeegee, and sponge includes a curved edge on the scraper or squeegee blade adapted to fit complexly-curved (double-curved or "bubble") windshields and other surfaces of different radii. Preferably the edge is formed between a first or inner surface which is curved perpendicular to the edge so that the inner surface is concave. The other side of the blade, the outer surface, is preferably also curved but to a smaller radius than the inner surface.

5 Claims, 12 Drawing Sheets

SCRAPER OR SQUEEGEE WITH CURVED BLADE SURFACES

FIELD OF THE INVENTION

The present invention relates primarily to improved cleaning of curved windows, especially automobile windscreens, sometimes also referred to as windshields.

REVIEW OF THE RELATED TECHNOLOGY

Windshield curved in one direction have been used in autos for many years. Recently, auto manufacturers have designed the auto body in aerodynamic shapes for better milage by applying complex double-direction curvatures in every part of the auto body including the windshield and other glass.

The conventional squeegee with a straight or flat surface produces unsatisfactory results with the aerodynamic shapes of auto windshield and door or window glasses that employ convex complex curvatures, i.e. their surfaces are curved in two directions like a sphere instead of in just one direction like a cylinder or cone. The two curvatures of the convex auto windshield surface are denoted as bulge and roll.

The unsatisfactory results of conventional devices include streaks and/or incomplete wiping due to the un-matched surfaces, i.e. the conventional squeegee has horizontal plane surfaces but the auto windshield and other glasses have a complex convex configuration.

If the windshield is curved in only one direction, then a squeegee or scraper having a straight edge can be used if the straight edge is aligned with the non-curved direction along the glass. However, this requires an awkward grip and extra work to find the correct orientation and maintain it while wiping or scraping.

It has been discovered that the conventional squeegee causes the users to consume unnecessary energy, time, and effort, which stems from the unmatched surfaces.

Ordinary pressure under those circumstances is insufficient because it produces streaks and/or incomplete wiping on left and/or right side. To use the full length of the blade and sponge, an excessive pressure is absolutely required and also repeated wiping is necessary; this causes fatigue and even psychological depression due to frustration. On top of that, the center portion of blade and sponge, where most of the contact to the convex glass occurs, wears unevenly.

The hook type of wiper blade has a tension and compression force effect and boosts the pressure beyond manual pressure. The result is that it not only works as a squeegee but also tends to produce scratches. The auto windshield has many chances to get stains or small objects dried on the surface of the glass during a driving or parking period on top of frost, snow, or ice in the winter season. Those solid dried or frozen objects or stains on the surface of an auto windshield sometimes cannot be removed easily with a squeegee, but require extra hard material such as a scraper.

A separate scraper is sometimes hard to find when it is needed. If there is no scraper at the moment when it is needed, the users try to use the squeegee as a scraper to remove these materials. The result is, obviously, damage to the squeegee. Sometimes, users attempt to even remove snow, ice or even dried dirt from the rim of a tire with the squeegee when there is no scraper on hand.

SUMMARY OF THE INVENTION

To compensate for insufficient pressure which leads to incomplete cleaning on both left and right side, the need exists to provide concaved complex curvature (bulge and roll) to the wiper and sponge. The purpose is to generate stronger and more perfect compensating forces to cover the insufficient pressure generated during normal usage of a conventional squeegee. In the present invention this compensating force stems from a concave complex curvature configuration that fits or corresponds generally or substantially with the convex complex curvature of the auto windshield surface. The present squeegee for auto windshields, constructed with a concave configuration, also fits the convex surface of auto doors or window glasses to accomplish its function in an improved fashion and without the need of exerting great pressure.

It is, therefore, an object of the present invention to overcome deficiencies in the prior art, such as indicated above. A further object of the invention is to provide auto windshield, window, and body cleaning device comprising a scraper and a squeegee which can more easily and affectively clean any kind of tough job on convex surfaces that the conventional squeegee can not.

Another object of the invention is to provide a cleaning tool organizer which combines a scraper and a squeegee to offer convenience in use and storage.

Yet another object of the invention is to locate the dried dirt or bug, frost, snow, and ice-removing scraper to one side and a squeegee with sponge to the opposite side.

Still another object of the invention is to put the squeegee closer together to the sponge at the same side, and thereby the squeegee blade removes any objects ahead of the sponge, and/or the sponge soaked with solution goes first and thereafter the squeegee blade wipes the surface inward to set free any debris and/or excess solution.

Still a further important object of the present invention is to provide an auto windshield and body cleaning device comprising concave complex curvatures for the scraper, squeegee, sponge, and/or squeegee retainer. This permits scraper, squeegee, and sponge to fit onto the convex shape of an auto windshield or auto body, and it also assures absolute application of the cleaning solution and wiping with less effort.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Figure 1:
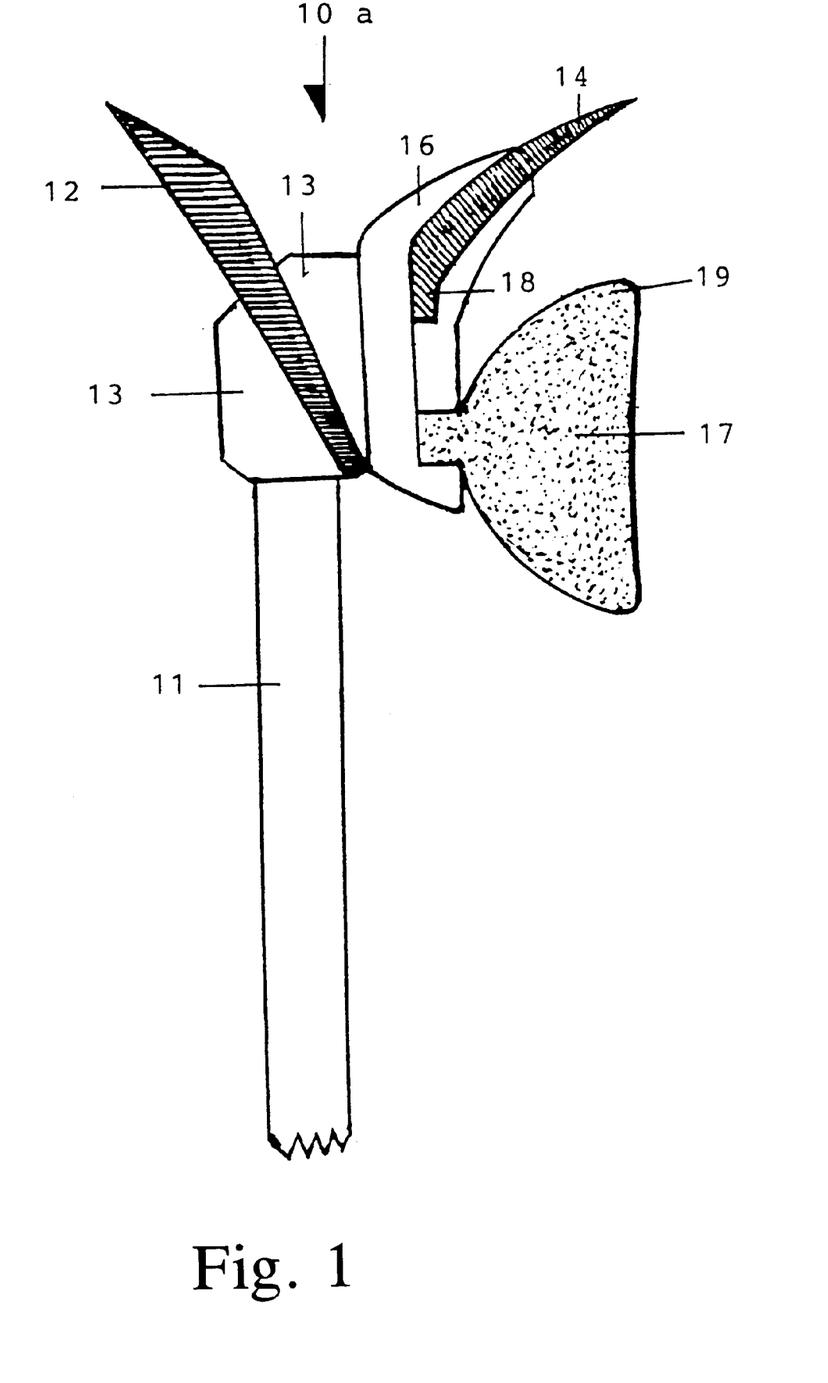
FIG. 1 is a side elevation view of an embodiment the combined cleaning device of the present invention.

In FIG. 1 the combined cleaning device of the present invention, a squeegee and/or sponge and/or scraping tool, is denoted by numeral 10a. It includes a handle 11 and a scraping tool 12 of hard material secured diagonally in any suitable manner to the top portion of handle retainer 13.

The squeegee retainer 16 is preferably placed on the opposite side from the scraping tool 12. The squeegee 14, made of elastic material such as rubber or elastomer, is secured in any suitable manner to the upper outer end of squeegee retainer 16. The solution absorbent sponge 17, is secured in any suitable manner to the lower end section of squeegee retainer 16.

FIGS. 2–5 show that the blade 15 of the scraper 12 also employs a concaved bulge curvature so as to fit onto the convex bulge curvature of an auto windshield, and the axis of the bulge curvature is parallel to that of the auto windshield.

A squeegee, or a windshield, is not often thought of as having an axis, but almost any curved surface or line has an axis. If a windshield is if of single curvature (it is curved in only one direction) then it has an axis defined by that curvature. If the single curvature of the surface is uniform, then the surface is cylindrical and the cylinder axis is the axis of the windshield; if the surface is conical, it also has an axis. If the curvature is non-uniform in the sense that the degree of curvature varies from place to place then the windshield still has a local axis corresponding to any particular small area. For example, most older auto windshields are strongly curved at the sides and relatively flat in the middle; the axis for an area of the middle section is in the middle of the back seat but the axis for a strip along the side, where the radius is less, is very close to the windshield.

In the case of a convexly-curved or double-curved windshield it might seem that there is no axis. But whenever a squeegee or scraper blade is laid onto a convex surface it defines a line of contact, and the contact line will define an axis because the contact line is, generally, a portion of a circle.

For example, if the windshield is semi-spherical then a ring of any radius less than that of the sphere itself can be placed onto the surface, but the axis defined by the contact line between the sphere and the ring depends on the size of the ring and its location. The globe is an example, where lines of latitude, having different sizes, all share one axis (the polar axis), while lines of longitude, which are great circle lines, share no axis. Returning to the present invention, whenever the curved squeegee or scraper lies in contact with the windshield surface the line of contact defines a common axis.

As in the case of the globe, where lines of smaller radius of curvature (the latitude lines) can make contact with a surface of larger radius (the globe), so in the present invention the arc of the scraper edge 15 or the edge of the squeegee 14 or sponge 17 can make nearly perfect contact with windshields of varying curvature by suitably inclining the handle 11.

Figure 2:
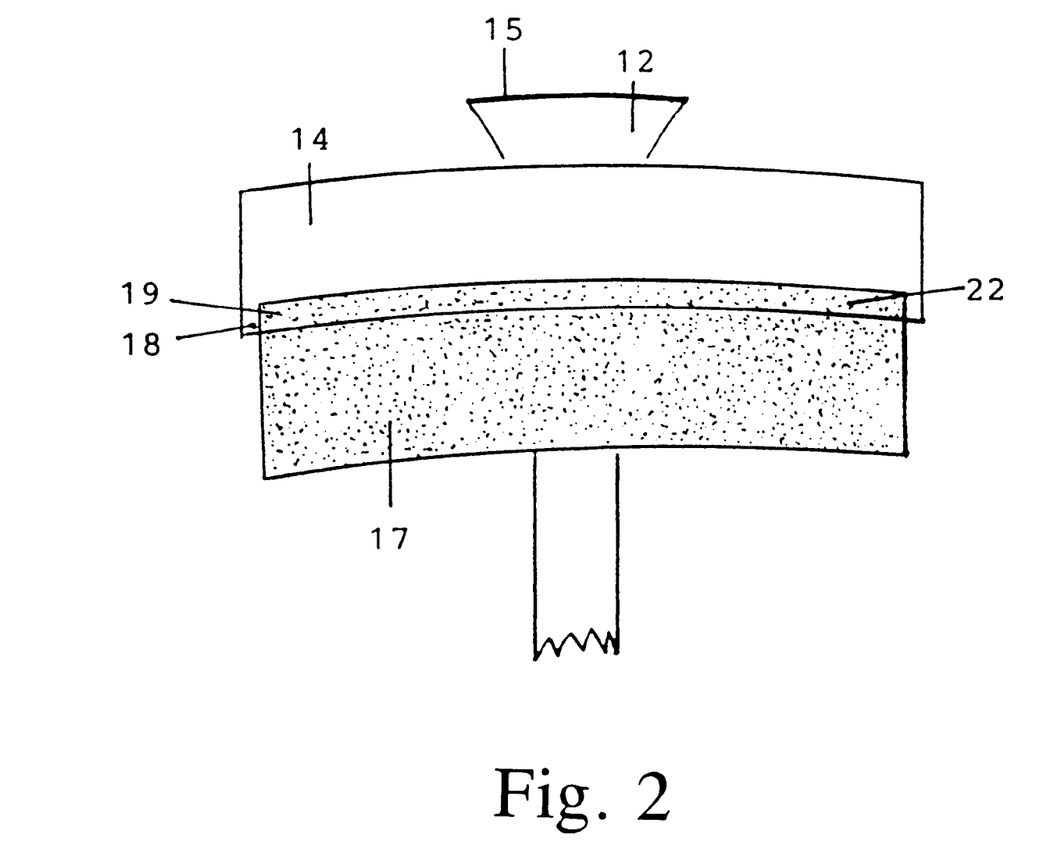
FIG. 2 is a front elevation view of the cleaning device of FIG. 1.

FIGS. 1 and 2 illustrate the improved configuration of the present invention. Two components, squeegee 14 and sponge 17, are placed together overlapping each other. In particular, the squeegee base 18 and the upper ridge 19 of the sponge are overlapped; this overlap is denoted by reference numeral 22 in FIG. 2. The squeegee 14 and the sponge 17 are fixed in position so closely that these two components always work together by associating each other during the engagement with surface, i.e. while the sponge 17 places water or solution on the windshield surface, the squeegee 14 moves around together with sponge 17 and scratches off adhered objects, if any, besides its wiping function. In this way, the surface can be cleaned perfectly and quickly.

The contemporary auto windshield is configured in an aerodynamic shape that employs convex complex (bulge and roll) curvature. The conventional squeegee, wiper and sponge, does not have a configuration reasonably matching in configuration the convex spherical surface of the auto windshield.

Figure 6A:
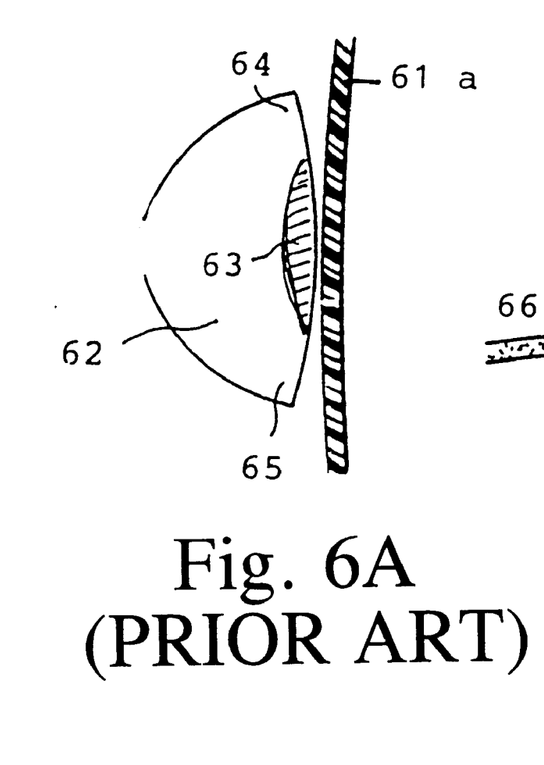
FIG. 6A, labeled "prior art", is a side elevation view of a conventional sponge engaged against a windshield.

In FIG. 6A, the auto windshield 61a is designed with convex roll curvature but the front face from top 64 to the bottom 65 of the sponge 62 of the conventional squeegee is constructed with a convex (not concave) roll curvature. Therefore, only the central portion 63 can contact the convex curvature of the auto windshield 61a.

Figure 6B:
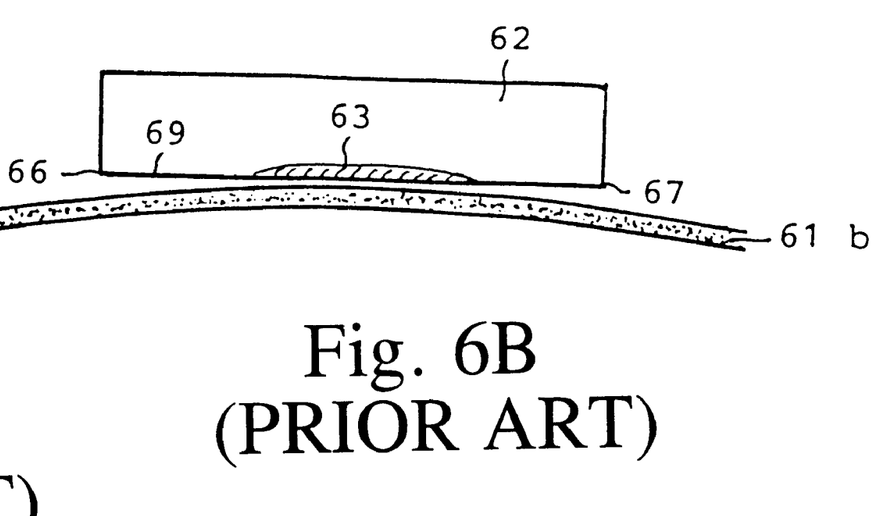
FIG. 6B, labeled "prior art", is a top cross-section view of the conventional sponge engaged against windshield.

In FIG. 6B, the front face 69, from left 66 to the right 67, of the sponge 62 of the conventional squeegee is constructed with a straight horizontal plane, but the auto windshield 61b has a convex bulge curvature. Therefore, the horizontal plane face 69 of the sponge 62 contacts only central portion 63 of the spherical surface, and both sides 66, 67 require hard pressure for complete contact to the non-matching convex surface of the auto windshield; this is another drawback. Due to the face of the sponge being un-matched to the configuration of the surface of the auto windshield, successful cleaning requires repetition of the sponging procedure.

Figure 6C:
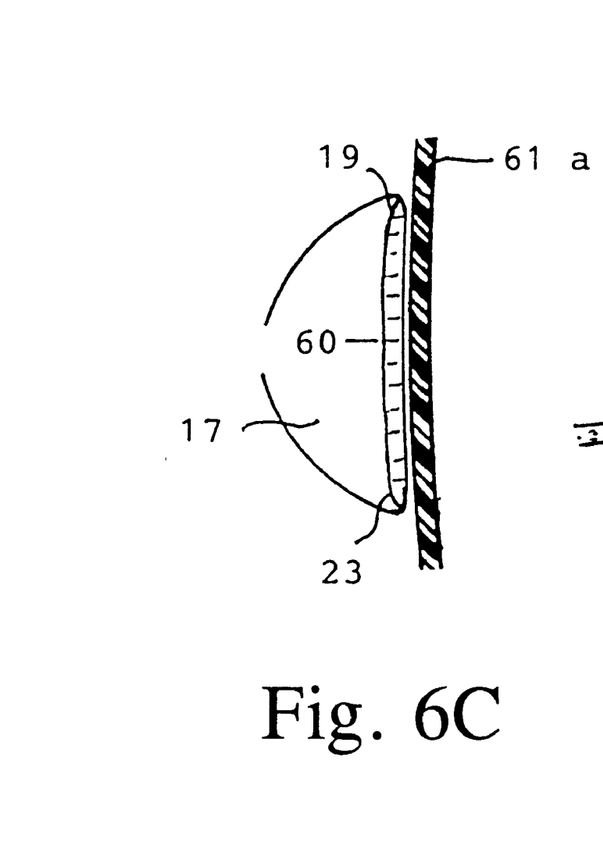
FIG. 6C is a side elevation view, partly in section, of the sponge of the present invention engaged against a windshield.

FIG. 6C shows a cross section of the sponge of the present invention. The auto windshield 61a is designed with a convex roll curvature, and so is the face of the sponge 17, which has concave roll curvature from the upper ridge 19 to the bottom ridge 23. Therefore, the whole area of the face 60 of the sponge 17 contacts the windshield with less applied pressure.

With this configuration the auto windshield undergoes tension and compression force effects from concave roll curvature during the application to the spherical surface of the auto windshield. The sponge 17 employs a horizontal axis parallel to that of the auto windshield's roll curvature.

Figure 6D:
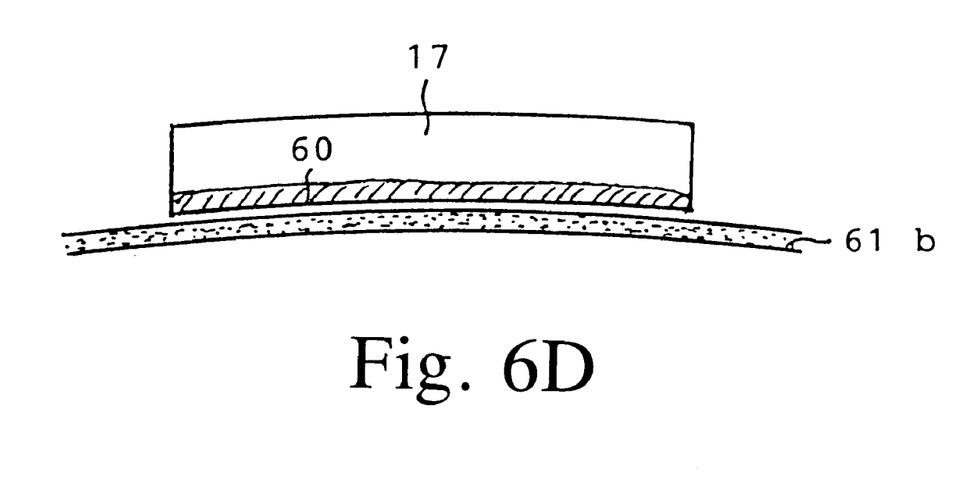
FIG. 6D is a top cross-section view of the sponge of the present invention engaged over a windshield.

In FIG. 6D, the auto windshield 61b is designed with a convex bulge curvature, and face 60 of sponge 17 is also designed with a concave bulge curvature. Therefore, the whole area of the sponge face 60 contacts the auto windshield 61b with less pressure than is required with a conventional device.

With this configuration, the auto windshield undergoes tension and compression force effects from concave bulge curvature during the application to the spherical surface. It employs a vertical axis parallel to that of the auto windshield. The present invention is a pronounced improvement in this regard.

Figure 6E:
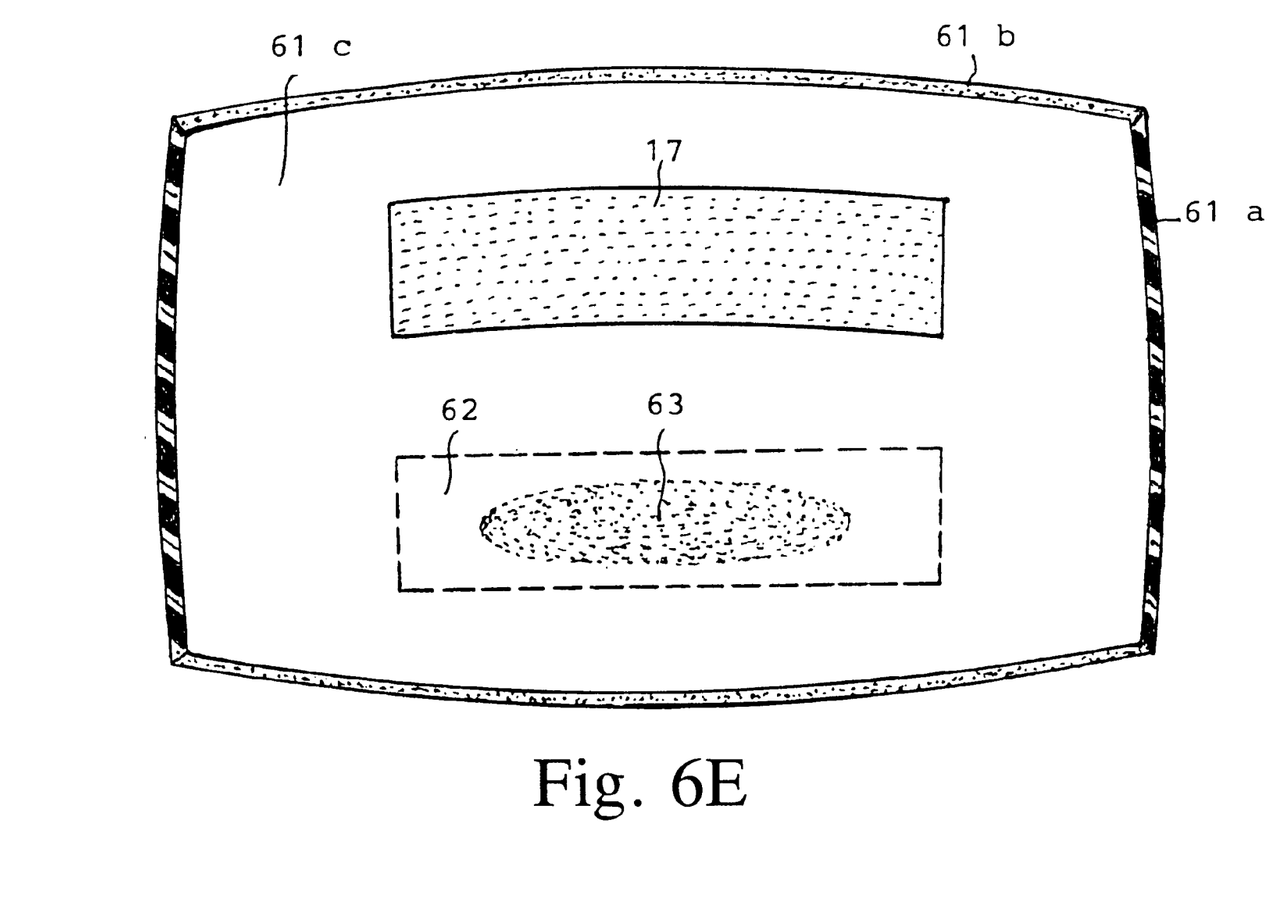
FIG. 6E is a partly schematic front elevation view of a sponge engaged on a windshield.

In FIG. 6E, the auto windshield 61c in overall configuration employs a convex complex curvature with a bulge 61b and a roll 61a. With this configuration, only the central portion 63 of the conventional sponge 62 could contact the convex auto windshield. On the other hand, the sponge 17 of the present invention with its concave complex bulge and roll curvature fits almost the whole area of its sponge face to the spherical surface of auto windshield, resulting in successful application of solution with less pressure due to the matching configuration and bulge and roll tension and compression forces effect. It employs both vertical and horizontal axes parallel to that of auto windshield. The present invention is a pronounced improvement.

Figures 7A, 7B:
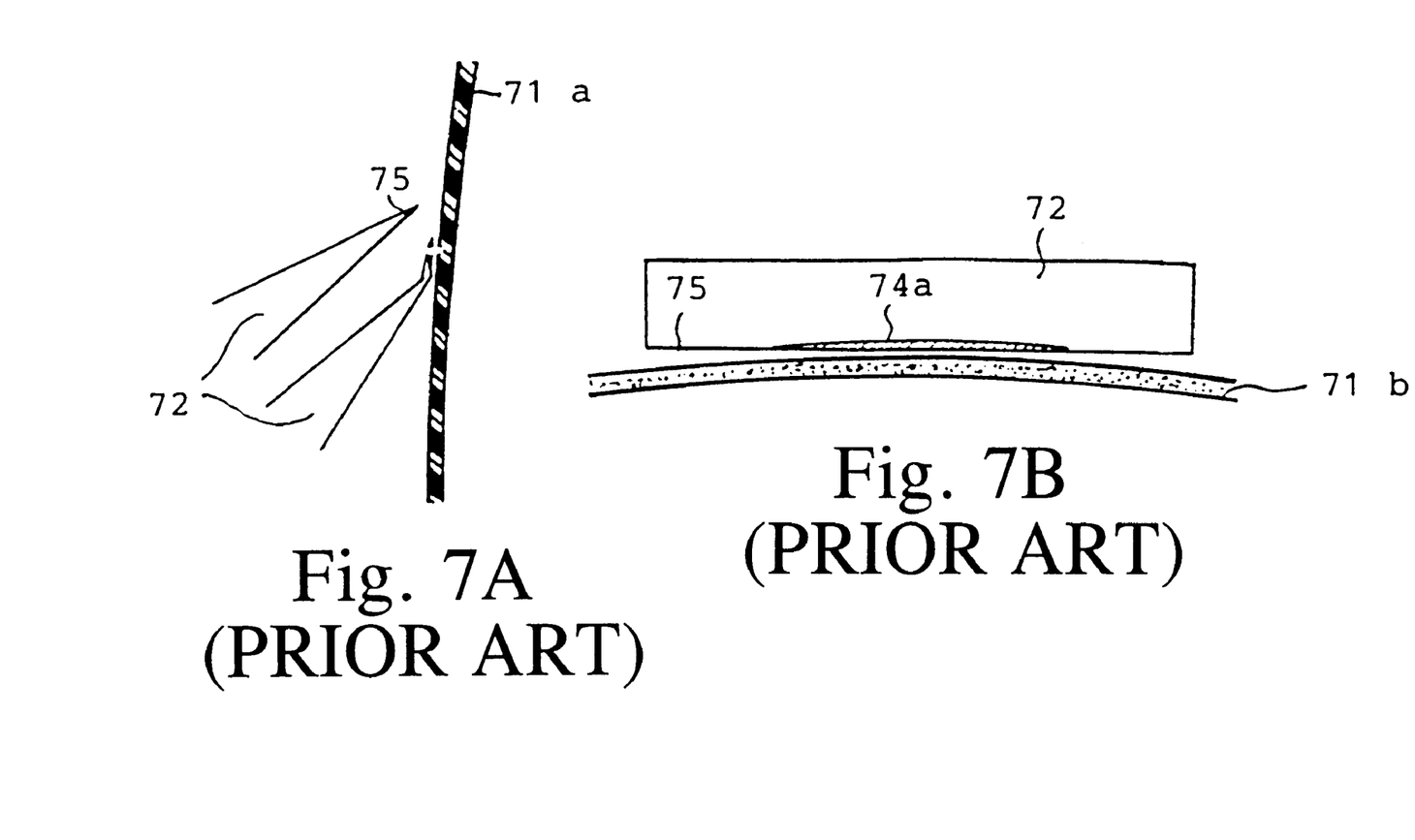
FIG. 7A, labeled "prior art", is a side elevation view of a conventional squeegee blade engaged against a windshield.
FIG. 7B, labeled "prior art", is a top cross-section view of the engaged conventional squeegee blade against a windshield.

In FIG. 7A, the thin and sharp end section 75 of a conventional squeegee 72 is constructed with plane face, therefore, the end section or sharp blade tip 75 can not be matched to the convex roll curvature of the surface of the auto windshield. The end section 75 generates less-than-optimum tension and compression force effects.

FIG. 7B shows how the conventional squeegee 72 is designed with a straight plane in width, and on the other hand, the auto windshield 71b is constructed with convex bulge curvature. Therefore, the end point 75 of the squeegee 72 contacts only a limited area 74a, at its central portion, against the spherical surface of auto windshield. This results in streaks to the both left and right sides during the wiping process. Excessive pressure is necessary and also process is required to be repeated many times for complete cleaning. It brings fatigue to user and damages the wiper and handle. It is a drawback.

Figure 7C:
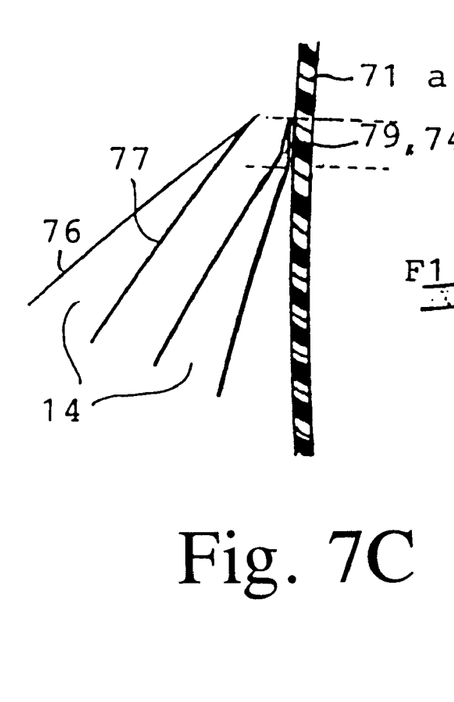
FIG. 7C is a side elevation view of the squeegee blade of the present invention engaged against a windshield.
Figure 7D:
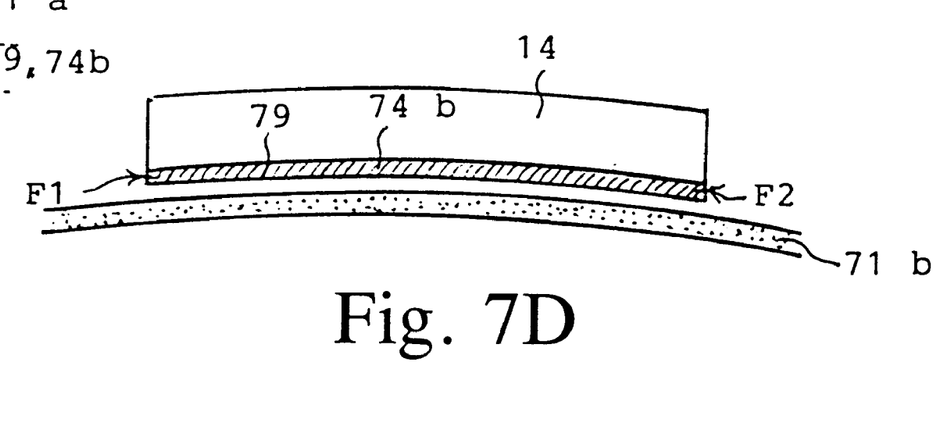
FIG. 7D is a top cross-section view of the squeegee blade of the present invention engaged over a windshield.
Figure 7E:
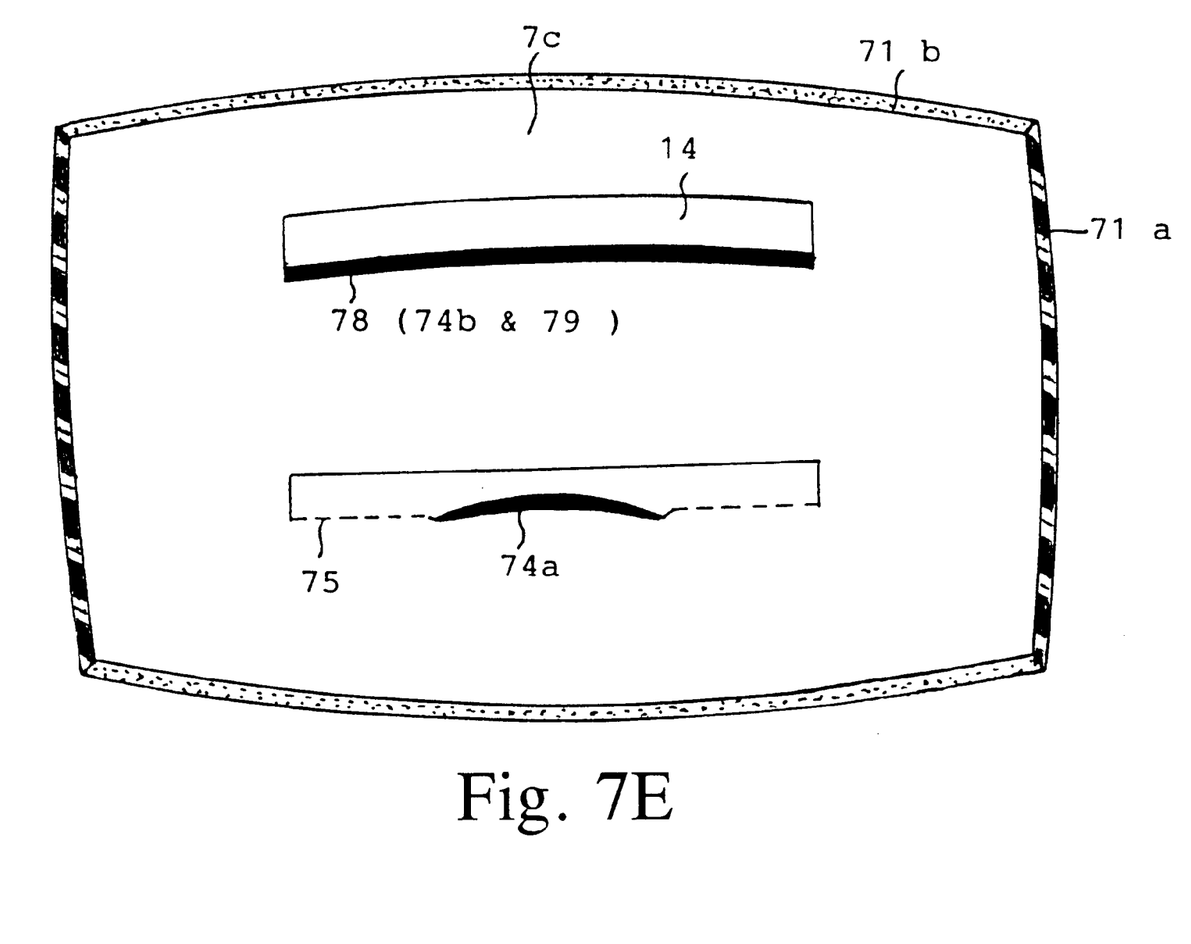
FIG. 7E is a partly schematic front elevation view of squeegee blades engaged over a windshield.

FIG. 7C shows the squeegee blade 14 of the present invention, which is constructed with a concave roll curvature. The sides of the blade 14 have both an outer curvature 76 and an inner curvature 77 which meet at the blade edge. In FIG. 7G, it is seen the radius R2 of outer curvature is less than the radius R1 of inner curvature. This configuration generates intensive tension and compression forces against the spherical convex surface 71a of the auto windshield, which improves the efficiency of removing liquid and dirt.

Figure 7F:
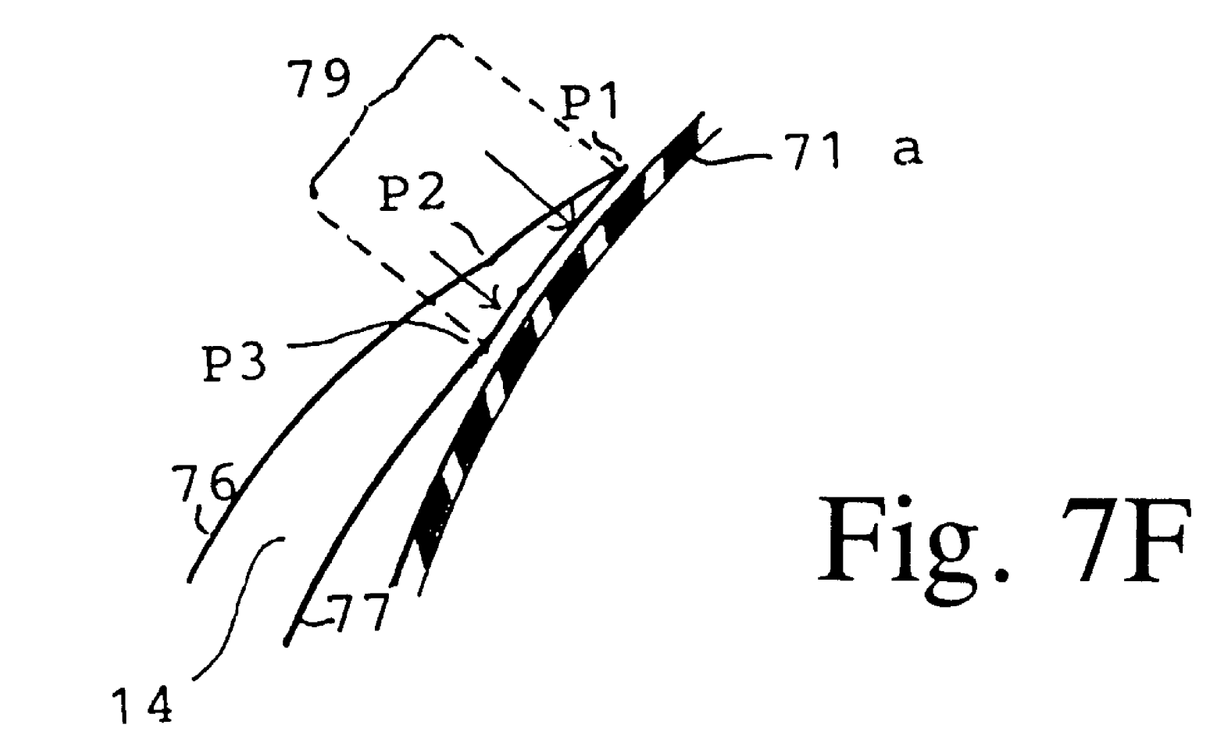
FIG. 7F is a side cross-section view of a squeegee blade of the present invention engaged over the windshield.
Figure 7G:
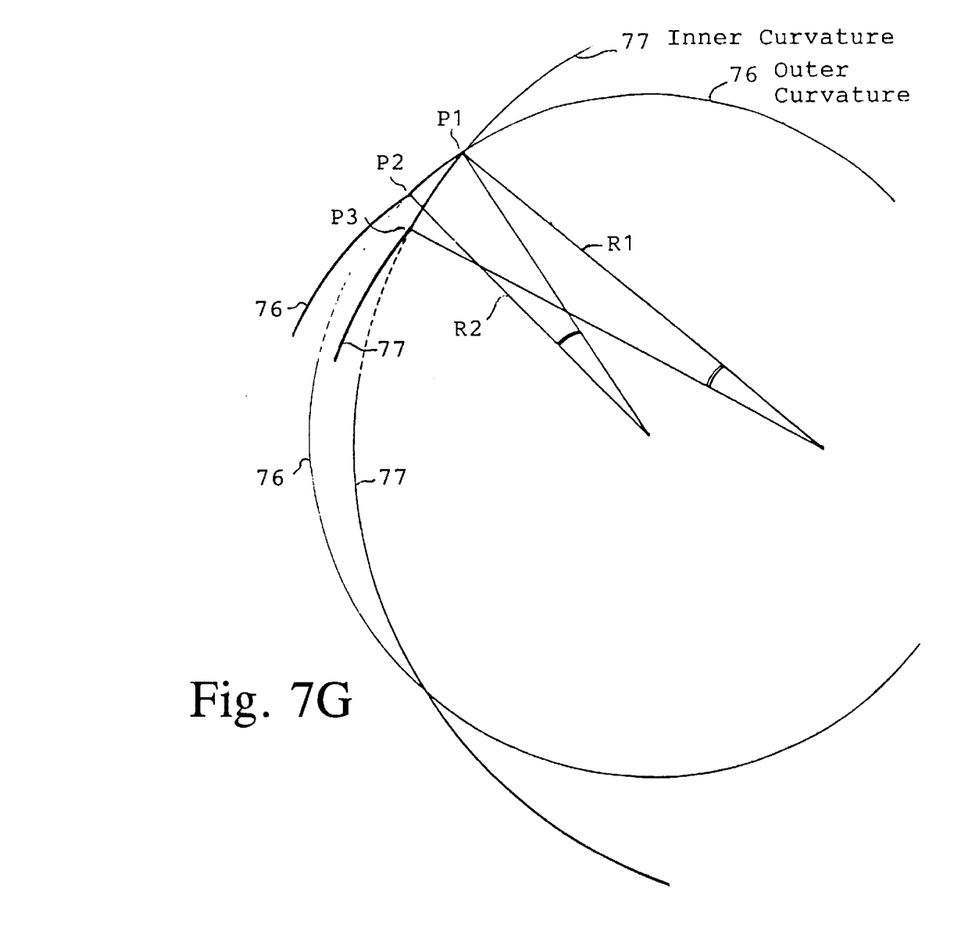
FIG. 7G is a partly schematic side cross-section view of a squeegee blade of the present invention.

FIG. 7F illustrates how pressure 79 forms at the end point P1, at the middle section P2 of the outer curvature, and at the point P3 where the inner curvature is being bent. This configuration cooperates to increase pressure by means of tension and compression force effects, and these effects permit complete wiping work with less manual pressure. The present invention employs a horizontal axis parallel to that of auto windshield. It is a pronounced improvement over conventional devices.

FIG. 7D illustrates that the present squeegee 14 is constructed with a concave bulge curvature. It employs a shorter radius than that from the axis to the auto windshield. It operates to generate bulge tension and compression force against the bulge convex spherical surface of auto windshield. During the application of the squeegee, there are tension and compression force effects from both sides F1 and F2 toward the central section 74b. It employs a vertical axis parallel to that of auto windshield.

In FIG. 7E, the auto windshield 7c employs a convex complex bulge 71b and roll 71a curvature like part of a spherical surface. Along with a convex complex curvature surface, the squeegee 14 employs a little smaller concave complex curvature to generate tension and compression force to clean perfectly 78 (complete cleaning without streaks, 74b and 79), easily (without excessive pressure) and quickly (without repeated wiping).

The squeegee 14 employs both a vertical axis for bulge curvature and a horizontal axis for roll curvature parallel to that of auto windshield, that is, the axes of the windshield. A convex surface can be simply curved, like a sphere, with equal radii in either of two directions along the surface; or it an be complexly curved with different radii of curvature in different directions, like a football or an egg.

Figure 3:
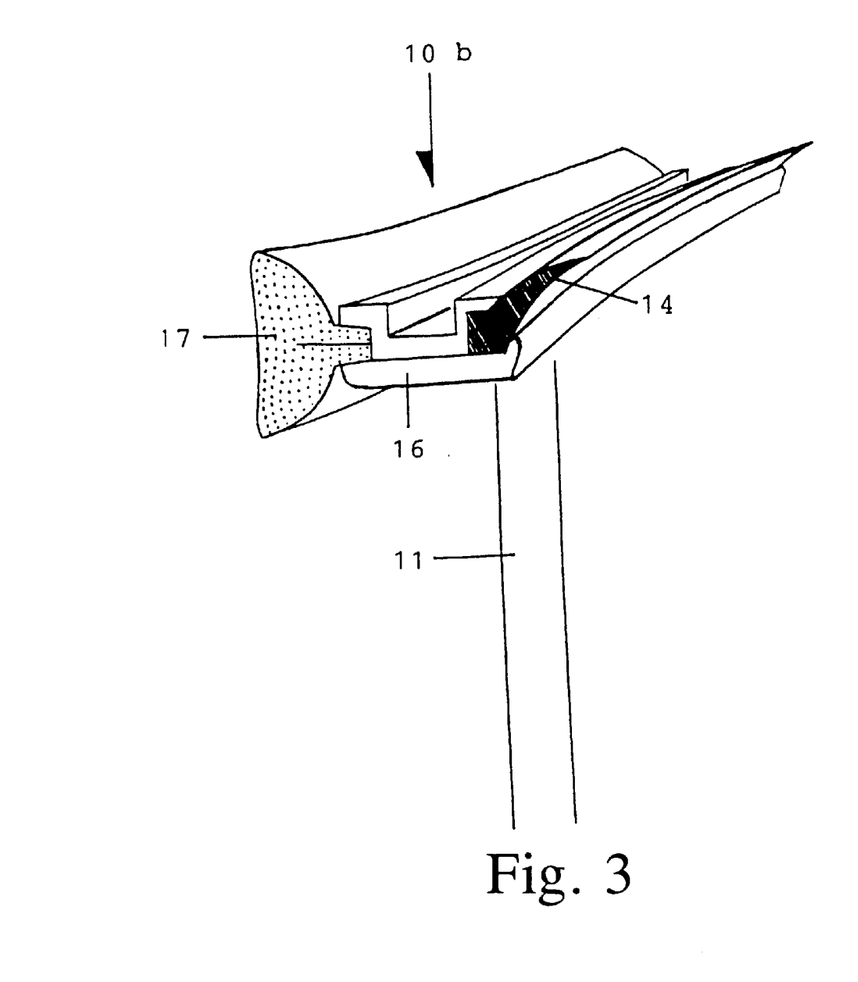
FIG. 3 is a perspective view of an alternative embodiment of the present invention showing a concave complex curvature.

FIG. 3 shows how the squeegee blade 14 of the present invention is, preferably, curved in two directions.

The inside surface 77 of the blade 14 is curved in cross section, as shown by the end shown closest to the viewer; however, the blade 14 is also curved in a second direction. The blade 14 as shown in FIG. 3 also curves around a vertical axis, and this direction of curvature is generally perpendicular to the first direction shown by the cut-off end. Therefore, the surface 77 of the blade 14 is complexly curved; the surface 77 is not a portion of a cylinder, or a cone, but rather a portion of a sphere, ellipsoid, hyperboloid, etc.

Figure 4:
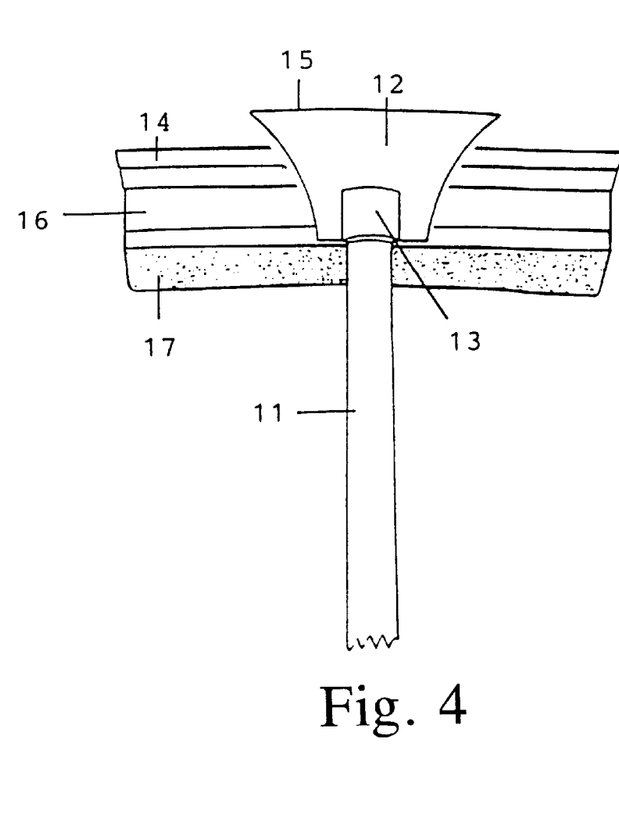
FIG. 4 is a rear elevation view of the FIG. 1 device.
Figure 5:
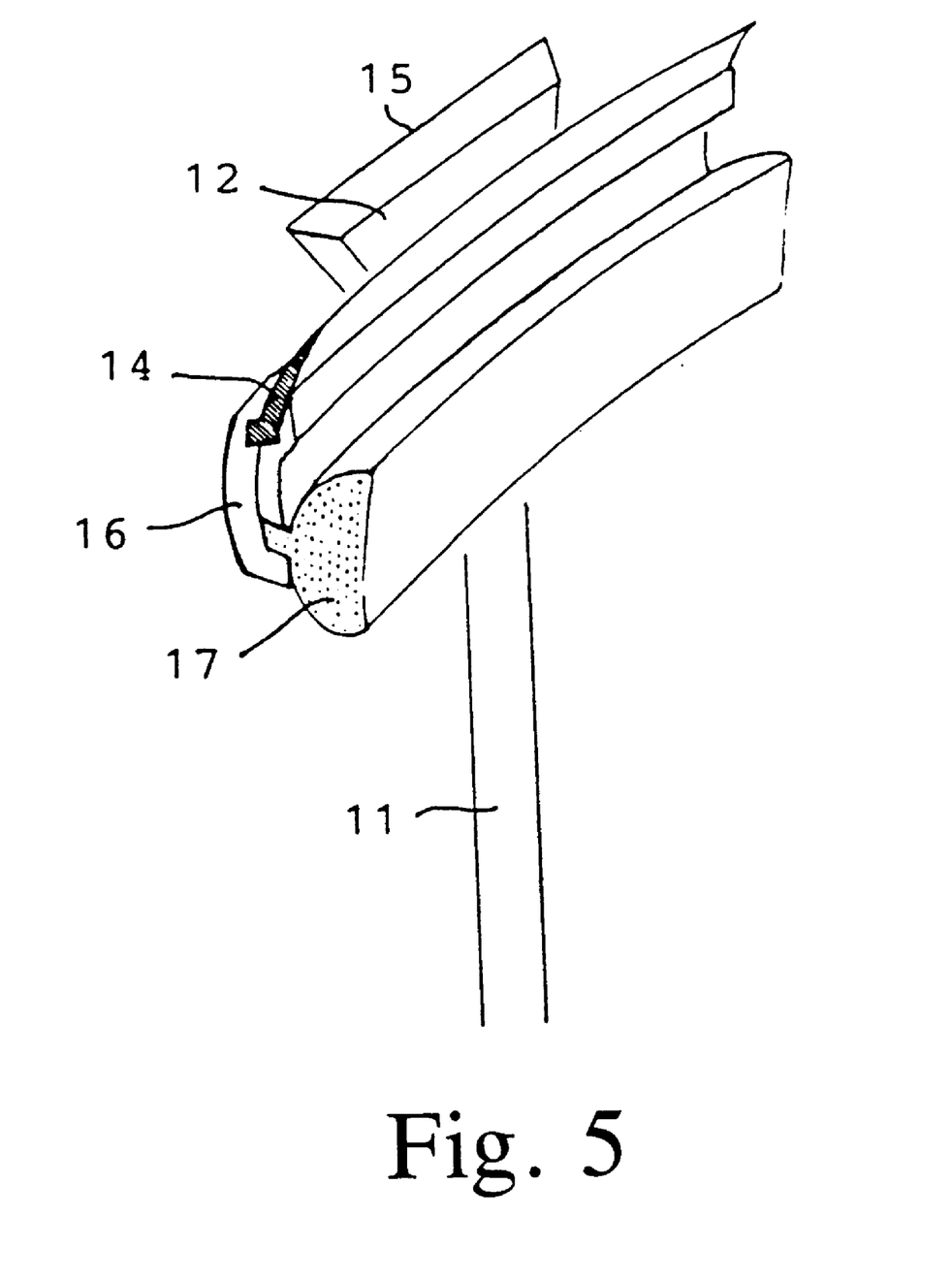
FIG. 5 is a perspective view of the combined cleaning device of FIG. 1.

The blade edge is preferably curved in a plane angled to the length of the handle 11, so that a curvature can be seen in the edge when looking perpendicular to the length of the handle (as shown in FIG. 4) and also when looking parallel to the length of the handle (this is seen in FIG. 3). However, the present invention includes any curved-edge blade, whether of a hard scraper or a resilient squeegee.

The complex curvature prevents handle damage caused by a user's excessive pressure on the handle. The conventional squeegee contacts only central portion 74a of the wiper against the spherical surface of auto windshield and excess force is often applied in an attempt to increase the contact area.

The auto windshield cleaning device of FIG. 3 is a second embodiment of the present invention, denoted by numeral 10b, having a regular squeegee structure in which squeegee wiper 14 is placed opposite to the sponge 17, but in which the face of the wiper and sponge include the concave complex (bulge and roll) curvature as in the other embodiments, permitting them to match the configuration of the convex complex (bulge and roll) curvature of contemporary surfaces of auto windshields.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . ." and "means for . . ." as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A cleaning device for cleaning an automobile surface which is curved in two directions, comprising a handle, a cleaning element supporting structure attached to said handle, and three cleaning implements supported by said support structure, a first said cleaning element comprising a squeegee blade having a length, said squeegee blade having an edge extending along said length, said edge being curved in an arc, a second said cleaning element comprising a sponge having a length approximately the same as the length of said squeegee blade, said sponge being disposed adjacent said squeegee blade and in line therewith and disposed on a same side of the handle as said squeegee blade, and said sponge being curved in an arc approximating the curvature of said curved edge of said squeegee blade, and a third said cleaning element comprising a hard scraper having a generally straight edge, said scraper projecting in a direction generally aligned with said handle, said scraper having a length which is substantially shorter than the length of said squeegee blade.

2. An automotive cleaning device for cleaning a complexly-curved automobile surface, the device including a handle and a blade attached thereto, the blade including an inner surface and an outer surface meeting at an edge defining a line;

wherein the inner surface is complexly curved and concave; and wherein the line of the edge is curved;

whereby the edge evenly contacts the complexly-curved automobile surface and an entire length of the edge is usable for cleaning.

3. The automotive device according to claim 2, wherein the outer surface is complexly curved and wherein the inner surface includes a larger radius perpendicular to the edge and the outer surface includes a smaller radius perpendicular to the edge.

4. The automotive device according to claim 2, wherein the handle is elongated and the edge is curved within a plane generally askew the handle.

5. The automotive device according to claim 2, wherein the handle is elongated and the edge is curved within a plane generally perpendicular to the handle.

* * * * *